No. 687,521. Patented Nov. 26, 1901.
D. ELROD.
COMBINED TRY-SQUARE, CIRCLE-SQUARE, AND BEVEL.
(Application filed June 13, 1901.)
(No Model.)
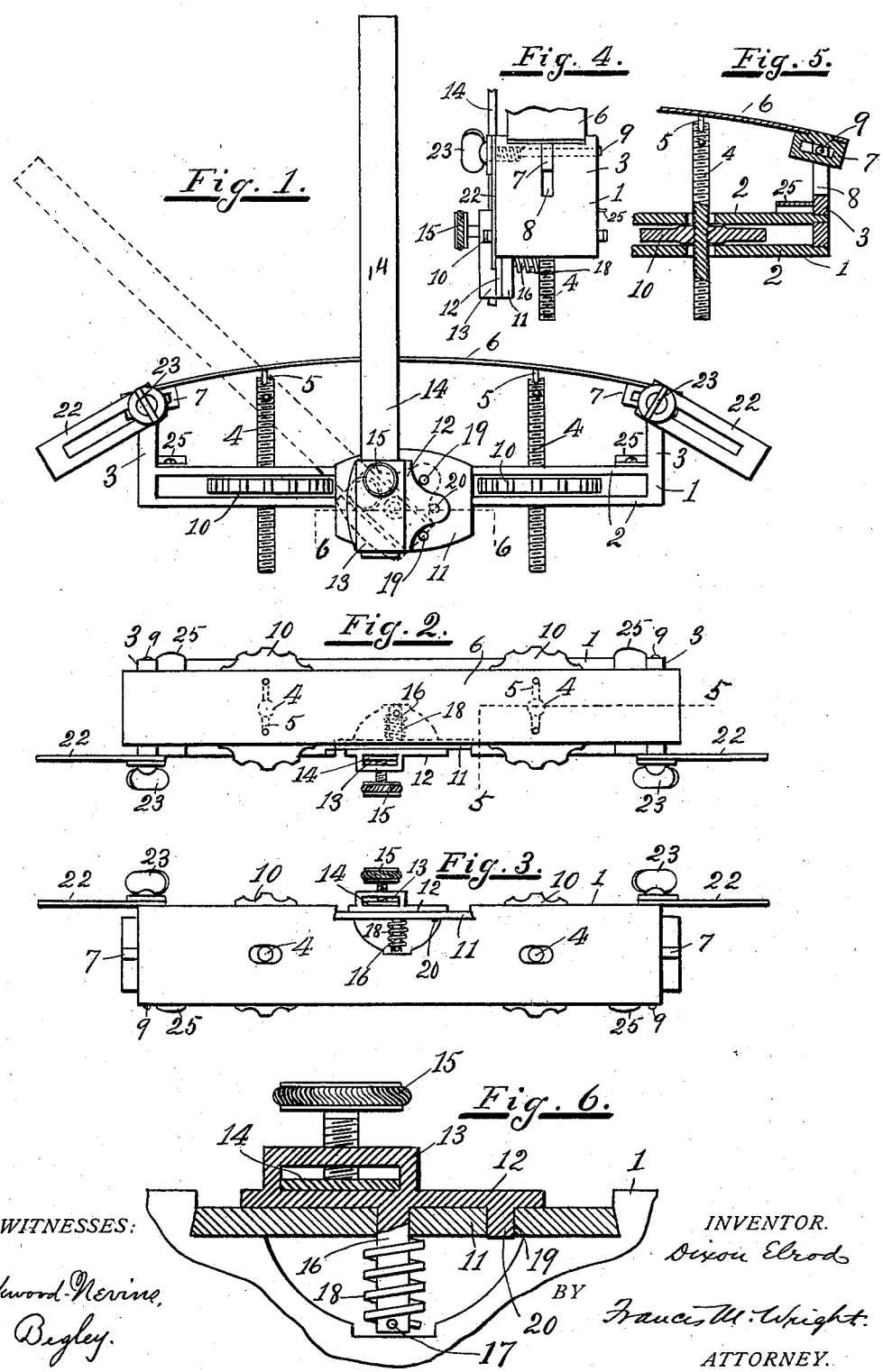
WITNESSES:
K. Lockwood Nevins,
M. T. Begley.
INVENTOR.
Dixon Elrod
BY
Francis M. Wright.
ATTORNEY.

UNITED STATES PATENT OFFICE.

DIXON ELROD, OF SAN FRANCISCO, CALIFORNIA.

COMBINED TRY-SQUARE, CIRCLE-SQUARE, AND BEVEL.

SPECIFICATION forming part of Letters Patent No. 687,521, dated November 26, 1901.

Application filed June 13, 1901. Serial No. 64,475. (No model.)

*To all whom it may concern:*

Be it known that I, DIXON ELROD, a citizen of the United States, residing at San Francisco, in the county of San Francisco and State of California, have invented certain new and useful Improvements in a Combined Try-Square, Circle-Square, and Bevel, of which the following is a specification.

My invention relates to improvements in combined try-squares, circle-squares, and bevels, the object of my invention being to provide a device of this character which shall be especially useful for planning parts of circles and curves of all kinds—as, for instance, in cutting out the frame for bay-windows.

My invention therefore resides in the construction, combination, and arrangement of the parts for the above ends hereinafter fully specified, and particularly pointed out in the claims.

In the accompanying drawings, Figure 1 is a plan view of my device, the try-square being shown in dotted lines in one of its positions. Fig. 2 is a rear view of the same. Fig. 3 is a front view. Fig. 4 is an end view of the same. Fig. 5 is a section on the line 5 5 of Fig. 2. Fig. 6 is an enlarged section on the line 6 6 of Fig. 1.

Referring to the drawings, 1 represents a suitable frame having two parallel side bars 2 and end bars 3 at right angles to the bars 2. Through said bars 2 are passed two threaded rods 4, the ends of which are attached by vertical yokes 5 to a flexible plate 6. The ends of said plate carry slotted guides 7, as shown in Fig. 5, said guides moving in recesses 8, formed in the ends of the bars 3, and being restrained by pins 9.

In order to move the rods 4 in and out with reference to the bars 2, there are provided milled wheels 10, through threaded apertures in which the rods 4 are screwed. Said wheels 10 are contained between the parallel bars 2, and thus by turning said wheels in one direction the rods 4 will be correspondingly thrust out, thereby producing a convexity in the plate 6, and by turning the wheels in the opposite direction the rods will be drawn in, producing a concavity in said plate, or, again, the two wheels may be turned in different directions, thereby thrusting out one of said rods and drawing in the other and producing in the plate 6 an ogee curve. Thus any desired curve within the limits required may be obtained by the movements of the rods.

Further, my improvement consists in the arrangement for providing a try-square in combination with the remaining features of the device. For this purpose the upper edges of the bars 2 are joined by a plate 11, in which is pivotally mounted a carrier 12, having formed thereon a channel 13. In said channel 13 is placed a steel rule 14, which is secured in position in said channel by means of a set-screw 15. The carrier 12 has formed thereon a pivot-pin 16, which extends down below the under surface of the plate 11 to a considerable distance, as shown in Fig. 6, and carries at its lower end a pin 17. Between said pin and the under surface of the plate 11 is held a coiled spring 18, the effect of which is to press the carrier 12 firmly down upon the plate 11. Said plate 11 has formed therein a series of holes 19, Fig. 1, and the carrier 12 has extending therefrom downwardly a pin 20, adapted to engage one of said holes. Said holes are so arranged in said plate that when the pin engages one of the holes of the series the rule 14 will extend in some definite angle from the bars 2—as, for instance, a right angle or an angle of forty-five degrees.

22 represents bevel-plates which are held upon the end bars 3 of the device and may be secured thereon at any desired angle by means of thumb-screws 23.

When it is desired to pack the device in a small compass, the rule 14 may be removed from its channel and held by means of spring-clips 25, secured on the front side of the front bar 2.

The device will be found of great advantage in cutting out frames for bay-windows. For instance, when it is desired to cut a curved molding of such a window and fit it against the straight molding adjacent to the window this may be effected as follows: First, the straight molding is secured in place, the end being cut off at a miter-angle. The flexible plate 6 is then curved with a concave curvature equal to that of the curved molding, it being understood that molding for this purpose is sold already curved with various degrees of curvature. The flexible plate 6 having been brought to the same curvature as the curved molding, so that it will fit snugly thereon along its whole length, the next operation is to tack on the sheeting of the window-frame a short strip of the curved molding, leaving sufficient room between the end of said strip and the end of the straight molding, which is already in place, to insert the bevel-plate 22 at that end. Said bevel-plate is now brought into contact with the cut end of the straight molding and is adjusted so as to fit snugly along said cut end and is then clamped. The short strip is now removed, having fulfilled its purpose, which was merely that of providing a rest for the instrument at a sufficient distance from the sheeting to allow bevel 22 to be adjusted. The instrument is then applied to the end of the curved molding which is to be fastened to the window-frame, and by means of the bevel-plate 22 the end of said molding is cut at such angle as will fit snugly against the cut end of the straight molding. The curved molding is now ready to nail in place and will form a close continuation of the straight molding.

Heretofore great difficulty has been experienced in cutting off the curved molding so as to make this a snug fit. By the combination of the bevel-plates secured at the ends of the flexible plate, which is adapted to be brought to any desired curvature, this result is attained.

I claim—

1. In a device of the character described, the combination of a frame comprising parallel side bars, and end bars at right angles thereto, a flexible plate, guides carried by said end bars and engaging the ends of said flexible plate, screw-threaded rods attached to said flexible plate, and wheels, between the side bars through which the threaded rods are screwed, substantially as described.

2. In a device of the character described, the combination of side bars, end bars at right angles thereto, said end bars being recessed, a flexible plate, slotted guides carried by the ends of said flexible plate, moving in said recesses, pins for restraining said guides, screw-threaded rods attached to said flexible plate, and passed through said side bars, and means for extending said rods through said side bars, substantially as described.

3. In a device of the character described, the combination of a flexible plate, a rigid frame, comprising parallel bars, screw-threaded rods attached at one end to said flexible plate and wheels through which said screw-threaded rods are screwed, said wheels being held between said bars and restrained from axial movement thereby and said rods passing through slots in said bars, substantially as described.

4. In a device of the character described, the combination of parallel side bars, end bars at right angles thereto, a flexible plate, slidable connections between the ends of said plate and said end bars, rods attached to said plate and passing through said side bars, and means for extending said rods, substantially as described.

5. In an apparatus of the character described, the combination of side bars, end bars attached thereto, a flexible plate having slidable connections with the end bars, rods attached to said plate, means for extending and retracting said rods, a plate attached to the upper edge of said side bars, a carrier pivotally mounted in said plate, means for securing said carrier in any one of a series of predetermining positions, and a rule removably secured in said carrier, substantially as described.

6. In an apparatus of the character described, the combination of parallel side bars, end bars, a flexible plate having slidable connections with the end bars, means for bending said plate, a plate connecting the upper edges of the side bars, rule, and means for attaching the rule to the plate in any desired position, substantially as described.

7. In an apparatus of the character described, the combination of parallel side bars, end bars at right angles thereto, a flexible plate having slidable connections with the end bars, means for bending said plate, a plate joining the upper edges of the side bars, said plate having a series of holes therein, a carrier pivotally mounted in said plate, said carrier having a pin arranged to engage any one of said series of holes, a spring pressing said carrier down upon said plate, a channel carried by said carrier, and a rule removably clamped in said channel, substantially as described.

8. In an apparatus of the character described, the combination of a frame, a flexible plate carried by said frame, means for bending said plate, side bars, a rule, and means for attaching the rule to the frame at any desired angle, substantially as described.

9. In an apparatus of the character described, the combination of side bars, end bars at right angles thereto, a flexible plate having slidable connections with the end bars, means for bending said plate, and bevel-plates adjustably connected with said end bars, substantially as described.

10. In an apparatus of the character described, the combination of side bars, end bars at right angles thereto, a flexible plate having slidable connections with the end bars, means for bending said plate, a plate connecting the upper edges of the side bars, carrier adjustably mounted on said plate, a channel carried by said carrier, a rule adjustably secured in said channel, and a spring-clamp carried by the side bars and arranged to hold said rule when removed from said channel, substantially as described.

11. In an apparatus of the character described, the combination of a suitable frame, a flexible plate for drawing a curve, means carried by said frame for bending said plate to the desired curvature, a try-square adjustably mounted upon said frame centrally thereof, and beveled plates adjustably mounted on said frame at the ends of said plate, substantially as described.

In witness whereof I have hereunto set my hand in the presence of two subscribing witnesses.

DIXON ELROD.

Witnesses:
FRANCIS M. WRIGHT,
M. T. BEGLEY.